H. E. TOWNSEND.
METHOD OF MAKING RUBBER RINGS AND THE LIKE.
APPLICATION FILED OCT. 10, 1916.

1,322,843.

Patented Nov. 25, 1919.
2 SHEETS—SHEET 1.

INVENTOR
Harry E Townsend
BY
Ramsey and Parmelee
ATTORNEY

H. E. TOWNSEND.
METHOD OF MAKING RUBBER RINGS AND THE LIKE.
APPLICATION FILED OCT. 10, 1916.

1,322,843.

Patented Nov. 25, 1919.
2 SHEETS—SHEET 2.

INVENTOR
Harry E. Townsend
BY
Ramsey and Parmelee
ATTORNEYS

UNITED STATES PATENT OFFICE.

HARRY E. TOWNSEND, OF BROOKLYN, NEW YORK, ASSIGNOR TO ANCHOR CAP & CLOSURE CORPORATION, OF BROOKLYN, NEW YORK, A CORPORATION OF NEW YORK.

METHOD FOR MAKING RUBBER RINGS AND THE LIKE.

1,322,843.   Specification of Letters Patent.   Patented Nov. 25, 1919.

Application filed October 10, 1916. Serial No. 124,863.

*To all whom it may concern:*

Be it known that I, HARRY E. TOWNSEND, a citizen of the United States, and a resident of the city of Brooklyn, in the county of Kings, State of New York, have invented certain new and useful Improvements in Methods for Making Rubber Rings and the like, of which the following is a specification.

This invention relates broadly to the apparatus and the method of inserting formers in flexible hollow articles, and more particularly to a method to be employed in the manufacture of rubber bands, gaskets and the like.

The principal object of the present invention is the method facilitating the insertion of a former in a hollow plastic tube and facilitating the removal of the finished products from the former by introducing a layer of fluid under pressure, for example compressed air, between the former and the plastic member.

A more specific object of the present invention is the method for facilitating the insertion of a cylindrical mandrel within a rubber tube and the removal of rubber bands or gaskets from the mandrel after the tube has been suitably cut, by introducing compressed air between the mandrel and the rubber tube, and also between the mandrel and the finished bands or gaskets.

A still further object of the present invention is the method of applying and removing plastic members in the nature of a blanket or tube, from a mandrel or former which method is characterized by providing a layer of fluid under pressure between the former or mandrel and the blanket or tube and moving the former or mandrel relatively to the tube or plastic member.

Other and further objects of the present invention will in part be obvious and will in part be pointed out hereinafter and also by reference to the accompaanying drawings forming a part of this specification, wherein like characters are used to represent like parts throughout the several views thereof.

Figure 1:
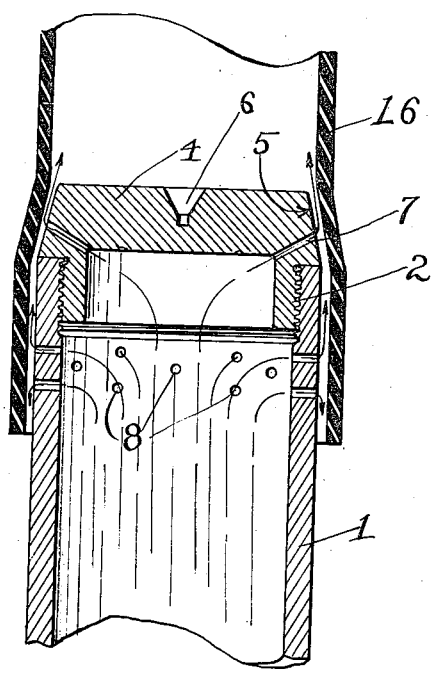
Figure 1:
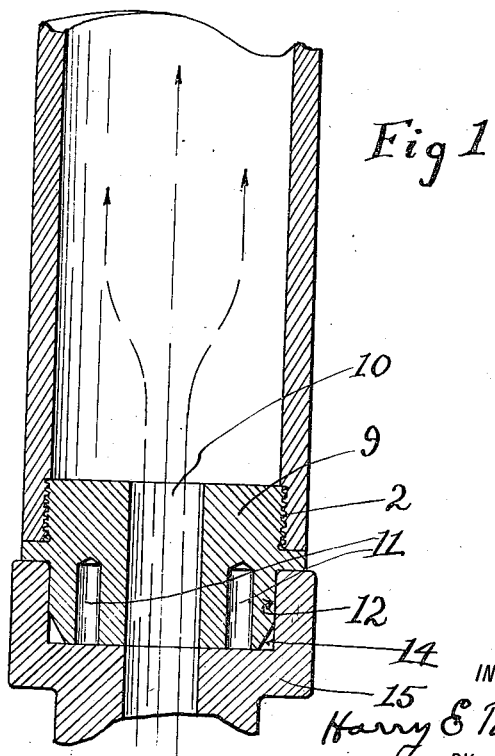
Figure 2:
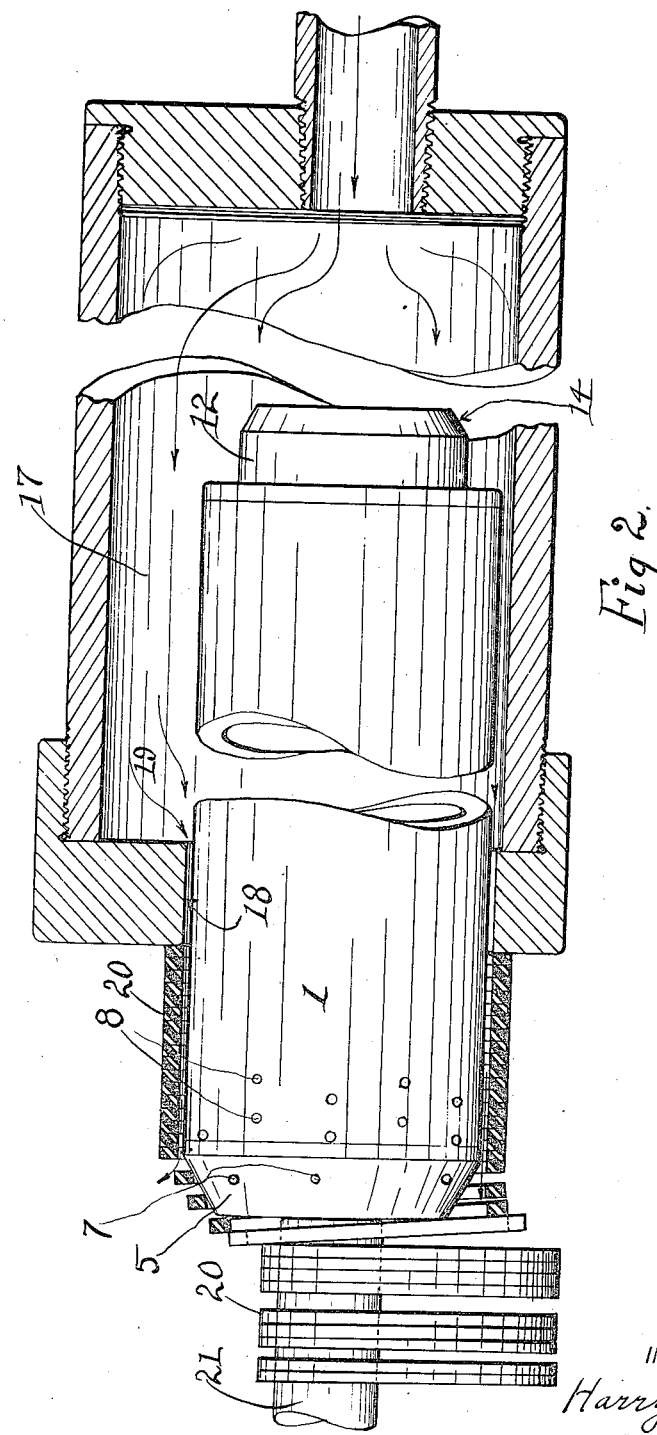

Figure 1 is a sectional view showing the mandrel and method of applying a rubber tube thereto. Fig. 2 is a view partly in section, showing the mandrel entering the compression chamber and the method of removing the finished articles from the mandrel.

In the manufacture of rubber and other semi-plastic articles, it is common in the art to provide a former or mandrel over which the said article is positioned and upon which the finished article is produced by the necessary elaborating operations. Particularly in the manufacture of rubber bands or gasket rings, it is common to provide a mandrel upon which a rubber tube is adapted to be placed so that the rotation of the mandrel adjacent a suitable operated knife will cut the individual bands or gasket rings from the rubber tube. Considerable difficulty has heretofore been encountered in slipping the tube over the mandrel and in removing the finished gaskets or rings from the mandrel. Various types and lubricants have been used but obviously lubricants are unsatisfactory in that such proceeding introduces a foreign substance which must be removed from the finished article and also considerable difficulty has been encountered in the manipulation and application of such lubricants.

I have found that a rubber tube may be easily applied to a mandrel by providing a layer of fluid under pressure, for example, compressed air, intermediate the mandrel and the tube while the tube is being slipped over the mandrel so that the mandrel is substantially out of contact with the tube during the operation of inserting the mandrel in the tube. I have also found that by introducing a fluid or air under compression between the mandrel and the finished rings or gasket, that the rings may be easily removed from the mandrel.

One apparatus for carrying out my method comprises a hollow mandrel preferably with a tapering entering end which mandrel is provided adjacent to the tapering end both in the cylindrical wall and the tapering wall with small openings or conduits leading to the hollow interior which is connected to a suitable source of compressed air through the medium of a connector coöperating with the other end of the mandrel. To place the rubber tube over the mandrel, the air receiving end is set in the compressed air connector pocket, preferably with the mandrel in a vertical position, and a rubber tube of a size to set tightly over the mandrel is placed upon the tapering portion of the mandrel. The compressed air flowing through the openings in the tapering portion expands the tube and as it is forced downward over the mandrel, preferably keeping it closely in contact with the tapering portion by grasping the exterior of the tube with the hands, the compressed air issuing through the openings necessarily escapes from the advancing end of the tube which is being forced downward over the mandrel. The relative movement of the parts is continued until the entire tube is in place on the mandrel and it will be noted that so long as the tube is retained in close relation to the tapering part, the air necessarily will escape by the path of least resistance which is the lower or unrestrained end of the tube, so that when the tube is in position on the mandrel a substantially complete blanket or layer of compressed air extends between the tube and the mandrel. As soon as the tube is in place the mandrel is removed from the air connector and may be suitably handled for the performance of elaborating operations upon the tube, such as by being placed in a suitable cutting lathe (not shown), wherein the mandrel is revolved and a suitable knife is successively brought into contact with the tube and moved one step lengthwise of the tube after each cut, until the entire tube has been cut into bands or rings.

For removing the rings from the mandrel, I provide a suitable chamber connected with a source of compressed air, and which chamber is of a length sufficient to receive the mandrel and provided in one end with an opening having a diameter slightly larger than the mandrel. After the rings are cut as specified one end of the mandrel is introduced into the compression chamber and the mandrel is then forced through the opening by means of a wooden stick or other suitable mechanism. As the mandrel enters the compression chamber the fluid under pressure, for example, compressed air, enters the interior of the mandrel and tends to escape between the mandrel and the wall of the opening. The end gasket contacts with the end wall of the compression chamber and since the pressure pushing the mandrel through the opening, is longitudinal of the mandrel, the force between the side of the end gasket and the end of the chamber is greater than the contractile force of the gasket upon the mandrel; consequently the compressed air escaping through the path of least resistance between the mandrel and the gasket slightly raises the gasket from the mandrel and forms a fluid or air blanket between the gaskets and the mandrel so that as the mandrel is forced into the compression chamber the gaskets are removed from the mandrel and received upon the stick or implement used to force the mandrel through the opening.

Referring now more particularly to the drawings, the mandrel is formed of a hollow metal tube 1 which is threaded at both ends as at 2. The entering end of the mandrel is closed by the screw threaded plug 4 which is provided with a tapering surface as at 5 and a center-point bearing 6 which is adapted to be seated upon a lathe center-point when the rings are being cut as previously described. The entering end of the mandrel is provided with a plurality of openings 7 in the conical or tapering wall of the plug and a plurality of openings 8 in the cylindrical wall of the tube. The opposite end of the mandrel comprises a plug 9 which is provided with an axial opening 10 and bores 11 which are adapted to connect with the lathe chuck to insure rotation of the mandrel in cutting rings. The plug 9 is provided with a reduced portion 12 and preferably is slightly tapered as at 14. The reduced portion 12 is constructed to fit within a nozzle or cup 15 of the air supply connector, the opening of which is connected with a suitable supply of compressed air. (Not shown.) When the mandrel is connected to this connector the rubber tube 16 is introduced over the tapering end of the mandrel in the manner and by the method hereinbefore described.

As previously stated, after the tube is in position on the mandrel it is suitably cut into individual rings, which must be removed therefrom. In Fig. 2 is illustrated the mechanism for removing the finished rings from the mandrel and comprises a compression chamber 17 operatively connected with a suitable supply of compressed air (not shown). This compression chamber is of a length sufficient to receive the mandrel and is provided at its front end with an opening 18 with the diameter slightly larger than the mandrel, so that the compressed fluid for example, compressed air, tends to escape as at 19 and as previously explained, the passage of least resistance for the compressed air is beneath the finished rings or gaskets 20, so that as the plunger 21, which may comprise a suitable wooden stick or other member forces the mandrel into the compression chamber the gaskets 20 are stripped from the mandrel and fall in succession upon the plunger. The compression of the gasket together longitudinally of the mandrel makes them act conjointly to insure the injunction of the air stratum between them and the mandrel, and also makes them operate conjointly in transmitting the holding force of the outlet wall of the compression chamber, to accomplish the stripping of the gaskets from the mandrel. As soon as the pressure of the plunger is released from the end of the mandrel the compressed air within the compression chamber forces the mandrel out of the compression chamber. In practice, I provide suitable cutoffs and air valves so that compressed air is not introduced through the nozzle 15 or 13 into the compression chamber 17 except at such times as these apparatuses are in use.

Since my invention may be carried out by slightly varying the method and apparatus herein disclosed, I desire that it be understood that the specific disclosure herewith is illustrative and not to be taken in the limiting sense.

Having thus described my invention what I claim is:—

1. The method of inserting and removing formers from plastic articles and the like which consists in placing the article on a former; then performing the finishing operation upon the said article; then introducing fluid under pressure between the said former and the finished article; and then removing the finished article from the former and maintaining the layer of fluid under pressure entirely around the former during the removing operation.

2. The method of inserting and removing elastic articles from mandrels, formers and the like, which consists in maintaining a layer of compressed gas between the said article and the said former during the telescoping operation whereby the article is moved over the former and without stretching the article beyond the elastic limit; then performing a finishing operation upon the said article; then again introducing a compressed gas between the mandrel or former and the finished articles and moving the former relative to the finished articles whereby the finished articles are removed from the former.

3. The method of manufacturing rubber rings, gaskets and the like which comprises starting a rubber tube over a mandrel, introducing and maintaining a layer of compressed air between said rubber tube and said mandrel, then telescoping said rubber tube and said mandrel without stretching the material of the tube beyond the elastic limit; then permitting the layer of compressed air to escape; then cutting the rubber tube into a plurality of rings or gaskets; then again introducing a layer of compressed air between the mandrel and the rubber rings or gaskets; and then tightly compressing the rings together and stripping the rubber rings from the said mandrel.

4. The method of removing rubber rings and the like from a mandrel which consists in introducing compressed gas between the mandrel and the rings in such manner as to entirely surround the mandrel, then compressing the rings together and stripping the rings from the mandrel and maintaining the said compressed gas under the rings during the stripping operation.

5. In the art of manufacturing elastic rings and the like, the method which comprises placing an elastic tube upon a mandrel previous to the performance of an elaborating operation thereon, introducing air intermediate the mandrel and the elastic portions of such tube after completion of the elaborating operation, and then stripping the elaborated portions from the mandrel while maintaining the air stratum.

6. In the art of manufacturing elastic rings, the method comprising placing a tube of elastic material upon a handling mandrel, separating the elastic material into sections encircling the mandrel, distending the sections by introducing a stratum of fluid under pressure between them and the mandrel, and stripping the sections from the mandrel while so distended.

7. In the art of manufacturing elastic rings and the like, the method comprising placing an elastic tube upon a work mandrel, separating the tube into sections encircling the mandrel, conjointly distending the sections by the introduction of a stratum of fluid between the mandrel and the inner surfaces of said sections, and conjointly stripping the sections from the mandrel while so distended.

HARRY E. TOWNSEND.